June 26, 1973

R. T. DAVIS 3,741,750

METHOD OF CONTROLLING BASIC OXYGEN FURNACE
AND BESSEMER CONVERTER PROCESSES

Filed Oct. 19. 1970

INVENTOR.
RICHARD T. DAVIS

BY

*Peter L. Klempay*

AGENT

United States Patent Office 3,741,750
Patented June 26, 1973

3,741,750
METHOD OF CONTROLLING BASIC OXYGEN FURNACE AND BESSEMER CONVERTER PROCESSES
Richard T. Davis, 18 Crumlin Ave., Girard, Ohio 44420
Continuation-in-part of application Ser. No. 34,267, May 4, 1970. This application Oct. 19, 1970, Ser. No. 82,215
Int. Cl. C21c 7/00
U.S. Cl. 75—60                                  2 Claims

ABSTRACT OF THE DISCLOSURE

A method of controlling the blowing process in a Bessemer converter or a basic oxygen furnace in which the blowing process may be brought to a definite end point indicative of proper oxidation and in which the necessity of further treatment of ingot deoxidation is eliminated. The amount and type of scrap introduced into the charge is precisely controlled, based on a history of previous blows.

---

Figure 1:
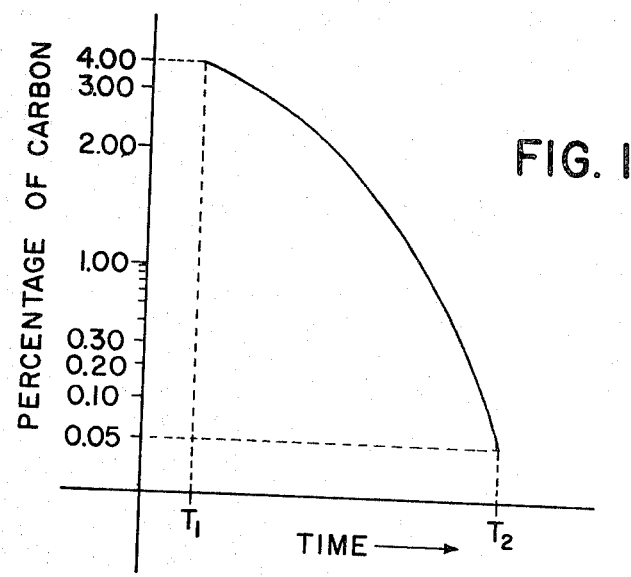

This application is a continuation-in-part of my copending application, Ser. No. 34,267, filed May 4, 1970 and now abandoned, for improvements in "Method of Controlling of Basic Oxygen Furnace and Bessemer Converter Processes," which application will now be permitted to lapse without prejudice, in view of its being superceded by this present application.

This invention relates to a method for controlling the blowing process in a Bessemer converter or a basic oxygen furnace. More particularly, the invention relates to a method in which the scrap introduced into the charge is precisely controlled so that excessive blowing and the resultant over-oxidation of the iron in the charge is eliminated.

In either the Bessemer converter or basic oxygen furnace process, molten iron is processed by forcing either air or oxygen through the molten bath. In the process, quantities of pig iron or scrap are introduced to the bath and the blowing process, the passage of air or oxygen through the bath, is continued to fully melt the introduced scrap and/or pig iron and to burn out the excessive carbon. However, in the processes heretofore used, excessive oxidation of the iron occurs because of the late melting point of the scrap which adds small amounts (for example, four percent) of carbon, high manganese, and silicon to the molten bath and thus causes the appearance of false end points and prevents a continuous consistent drop to the end point of the blowing process. The termination of the blowing process is the responsibility of the operator who examines the flame produced by the blow through blower's glasses or a spectroscope. However, the excessive amount of carbon introduced into the bath near the end of the blowing process, due to the late melting of the scrap, produces carbon lines in the spectrum which are scintillating, that is which appear, disappear, and reappear. Excessive blowing moveover, is undesirable as it produces excessive oxidation of the iron and the resultant ingots must be further treated to compensate therefor.

I have discovered that, by precisely controlling the amount of scrap, the carbon may be adequately burnt out of the bath prior to or simultaneously with the reaching of the desired end point so that a clear visual indication of the end point can be readily determined and the blowing process stopped before excessive oxidation of the iron has occurred. One method of determining the amount of scrap needed to be introduced into the molten bath is to first process a small batch of molten iron and introduce into the bath the amount of scrap which is most likely to produce the desired result and subsequently determine the visual end point of this small batch. From the results indicated by the end point of this first heat, the following heat may be adjusted to produce a clearer and more precise end point by cutting the pig iron scrap addition by from one to three percent. After having made the adjustment should the subsequent blow still have a considerable intensity of scintillation in the lines of the spectrum, further adjustments are to be made in the following blow or blows until the end point has been arrived at in a precise and definite manner, which does not include the aforementioned appearing, disappearing, and reappearing condition of the end point. Extrapolation of the results is then used to determine the quantities of content of larger heats. (After further refinement heats may be turned down early for higher carbon specifications.) Extrapolation of the results is then used to determine the quantity of scrap which is to be introduced into larger batches.

It is, therefore, the primary object of my invention to provide a method for controlling the blowing process in the steel making operation employing either a Bessemer converter or a basic oxygen furnace in which the process may be brought to a definite end point.

It is also an object of the invention to provide a blowing process and scrap charging process in connection therewith in which excessive oxidation of the iron is eliminated and, therefore, the need for subsequently killing or rimming the ingots cast from the steel is avoided.

Another object of the invention is to provide a method for regulating the blowing and scrap charging processes of a steel making operation which permits the determination and selection of the grade of the finished steel by the precise regulation of the scrap charged and by observation of the effect of such scrap.

A further object is the provision of such a process which may be carried out economically and with existing equipment.

For a more complete understanding of the invention, reference should be had to the following specification and the accompanying drawing wherein there is shown a preferred embodiment of the invention.

Figure 2:
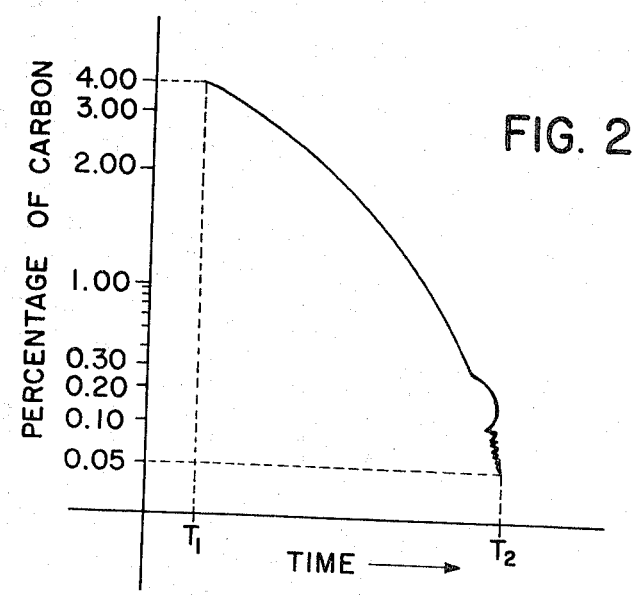

In the drawing:

FIG. 1 is a graph showing the relationship between the carbon content of the molten bath and the blowing time when the process of the present invention is employed; and FIG. 2 is a graph similar to that of FIG. 1 but showing the relationship between the carbon content and the blowing time in the processes of the prior art.

The process calls for the introduction of a small amount of blast furnace iron into the converter or basic oxygen furnace to be worked out as a heat, a sufficient (balanced) amount of scrap, ore, and flux which will melt out in an evenly molten heat (one in which the body of the molten iron charge blends with the melting coolant at the rate necessary for them to be equally dissipated in chemical content) which will arrive at the end point of the desired carbon content of between 0.04 and 0.05 carbon (without extra carbon, manganese or silicon being added by the late melting of the charge scrap). The first heat is carefully examined during the blowing process to determine the relationship between the carbon content and the oxidation of the iron. Various points are considered in determining this relationship. Among these points are:

(1) If large carbon sparks are given off late in the blow, too heavy scrapping is indicated;

(2) When the spectrum does not drop uniformly as shown in FIG. 1 but rather oscillates near its end point, as shown in FIG. 2, the amount of carbon remaining in the bath is excessive;

(3) The condition of the slag in the ladle is also indicative of the process. If the slag is in a runny, thin condition and is not hard, over-oxidation of the iron is indicated;

(4) The presence of a skull in the ladle is also indicative of improper blowing; and (5) Mold action of the ingot, showing either excessive drop or growth or necessitating the addition of deoxidizers, is a further indication of over-oxidation.

By examining the first heat, in light of the above points, it is determined whether or not the proper amount of scrap was introduced and whether the scrap was introduced at the proper time. Corrections to the amount of scrap introduced are then made and a second heat is processed. When the correct relationship has been determined, the amount of scrap needed for a larger heat is determined by extrapolation.

After establishing the necessary conditions for the small heat, a next larger blow may be made with a proportionally larger amount of strap being used to satisfactorily melt in the molten charge. Progressively larger tonnages are then processed, eventually arriving at full heat in which the correct proportions of scrap, ore, and flux are added and which produce the same results as the correct small test heats. The resultant product will be consistent in its temperature, chemistry, and balance of oxidation. On being poured into the molds, the steel remains at its poured height and in an inactive condition. As a result, the ingot is free of entrapped gases and slag inclusions and is thus of high quality. Also, the ladle is free of skulls.

In the Bessemer process it is advisable to agitate the molten bath and added scrap by rocking the converter vessel from a left of center to right of center position and back to the left of center position several times during the blow to assure that no scrap remains resting on the shoulders of the vessel or on blanked tuyeres. This wagging of the vessel assures a uniform mixing of the scrap into the molten bath so that uniform melting can occur and no portion of the scrap remains unmelted as the end of the blow approaches to increase the carbon content of the bath. In the basic oxygen furnace, such wagging of the vessel is unnecessary as the molten bath is maintained in an agitated state by the blowing action.

If the smaller heat method with the following extrapolation of the quantity of and type of scrap to be used per heat, as described above, should be objectionable, another method of establishing the scrap to be used is contemplated by the invention. This method involves the making of a nearly full size heat, the scrap of which consists of an amount one-half made up of butts, billets, etc., and the other half made up of regular cold pig iron.

One may observe the heat as to the scintillation of carbon lines by use of the spectroscope and thereby cut back the following heat or heats a small percentage of the amount of pig iron scrap used from the first heat in the series on through the following heats, depending upon what degree of scintillation is present in the progression of one heat to the next heat, until a heat is correctly scrapped and shows a clear spectrum devoid of any scintillation through the final period just preceding the end point.

The then established amount of scrap will make the above-mentioned perfectly oxidized heats until a change of molten iron is used; then adjustments must be made in the amount of scrap to be used to reestablish the above-mentioned condition of the end point.

It will be understood that the method described above may be modified and supplemented without departing from the spirit of the invention. Reference should therefore be had to the appended claims in determining the true scope of the invention.

I claim:

1. A method of operating a Bessemer or basic oxygen steel making vessel, comprising:
    (a) charging a quantity of molten blast furnace iron into the vessel;
    (b) charging a quantity of carbon containing scrap into the molten iron, the quantity of scrap being selected by calculation of the carbon content thereof so that the quantity of carbon introduced into the molten iron by the scrap is reduced to not less than a preselected end level simultaneously with the oxidation of the iron to a preselected level;
    (c) forcing a stream of oxygen-containing gas through the molten iron to oxidize the iron while reducing the carbon content;
    (d) observing the flame resulting from the passage of the gas to detect the degree of uniformity of the reduction of luminance of the flame and the pressure of carbon line scintillations in the flame;
    (e) terminating the passage of the gas when the carbon content is reduced to the preselected level;
    (f) withdrawing the molten metal form the vessel;
    (g) charging additional quantities of molten blast furnace iron and carbon containing scrap into the vessel, the quantity of scrap relative to the quantity of iron being reduced in the event a non-uniform reduction in luminance accompanied by carbon line scintillaton in the flame was detected as the preselected level was approached; and
    (h) repeating steps (c) through (f).

2. The method according to claim 1 wherein said preselected end level for said carbon content is approximately 0.05 percent carbon.

References Cited
UNITED STATES PATENTS

| | | | |
|---|---|---|---|
| 3,520,678 | 7/1970 | Frech | 75—60 |
| 2,354,400 | 7/1944 | Percy | 75—60 |
| 2,207,309 | 7/1940 | Work | 75—60 |
| 2,807,537 | 9/1957 | Murphy | 75—60 |
| 2,584,151 | 2/1952 | Morrison | 75—60 |
| 2,741,555 | 4/1956 | Cuscoleca et al. | 75—60 X |

HYLAND BIZOT, Primary Examiner

W. R. SATTERFIELD, Assistant Examiner

U.S. Cl. X.R.

75—52, 57, 59